(No Model.) 3 Sheets—Sheet 1.
A. WOLFMULLER.
VELOCIPEDE.
No. 547,511. Patented Oct. 8, 1895.
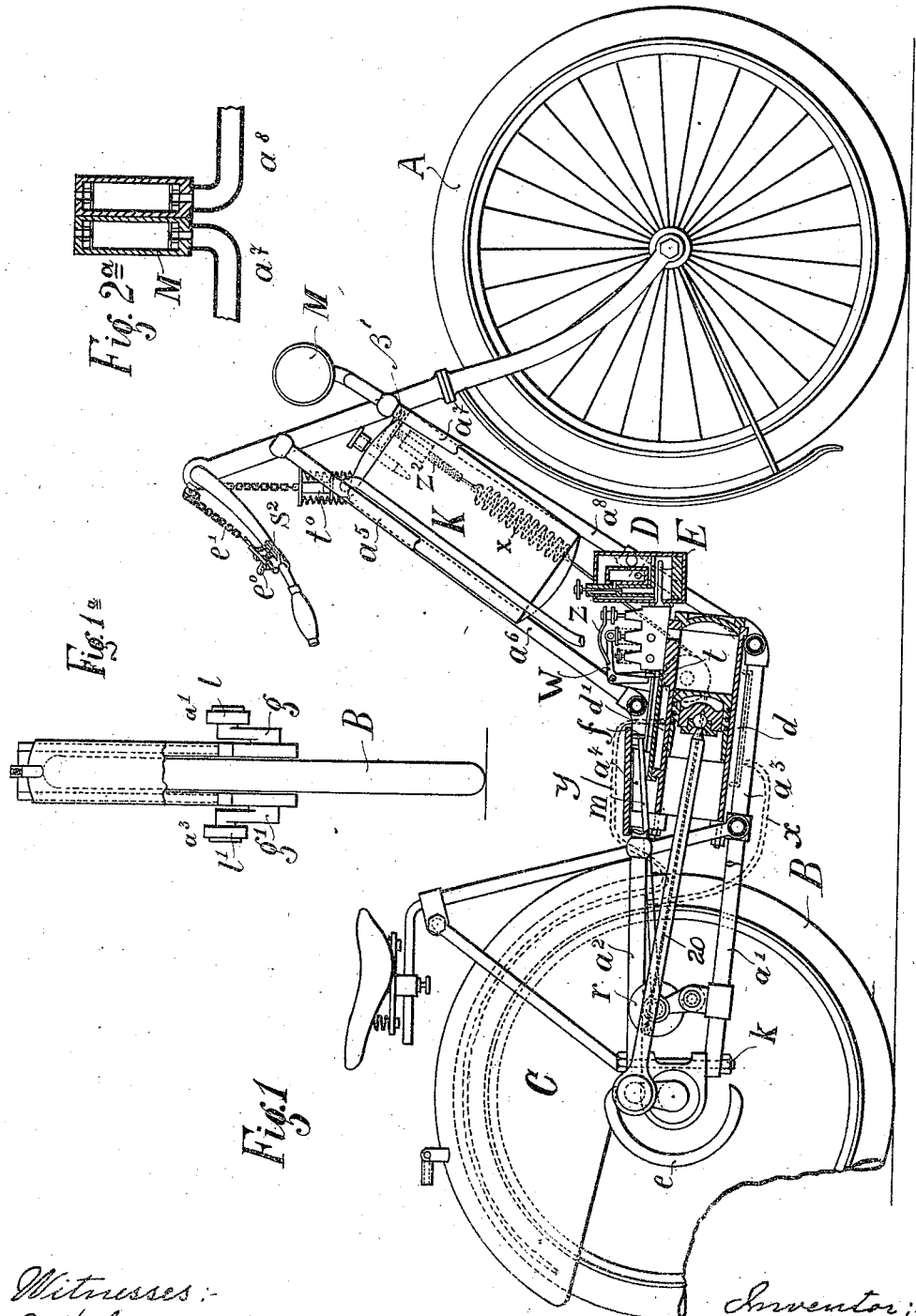
Witnesses:
E. K. Sturtevant
H. van Oldenneel
Inventor:
Alois Wolfmüller,
by Richards & Co
Attorneys

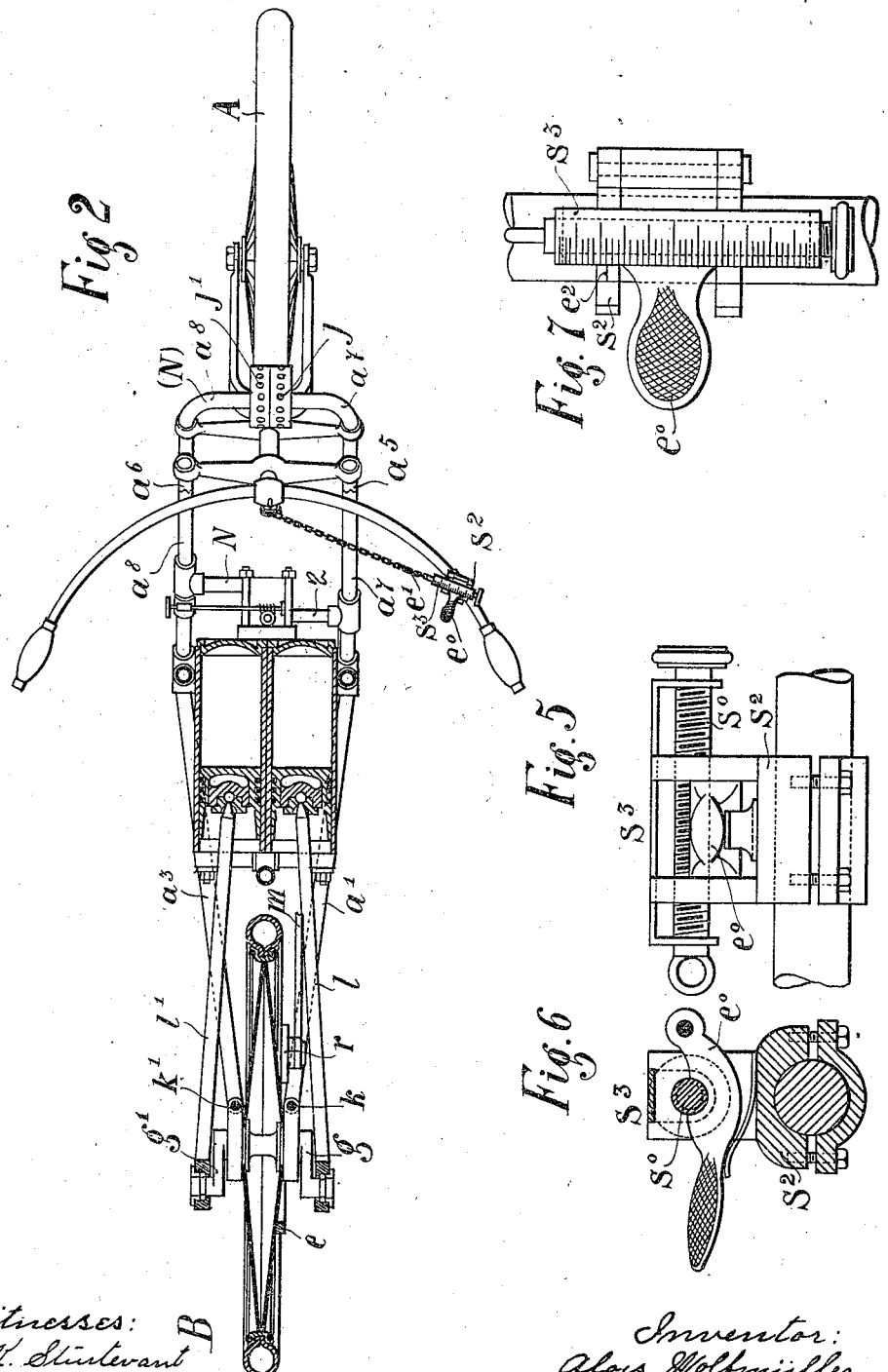

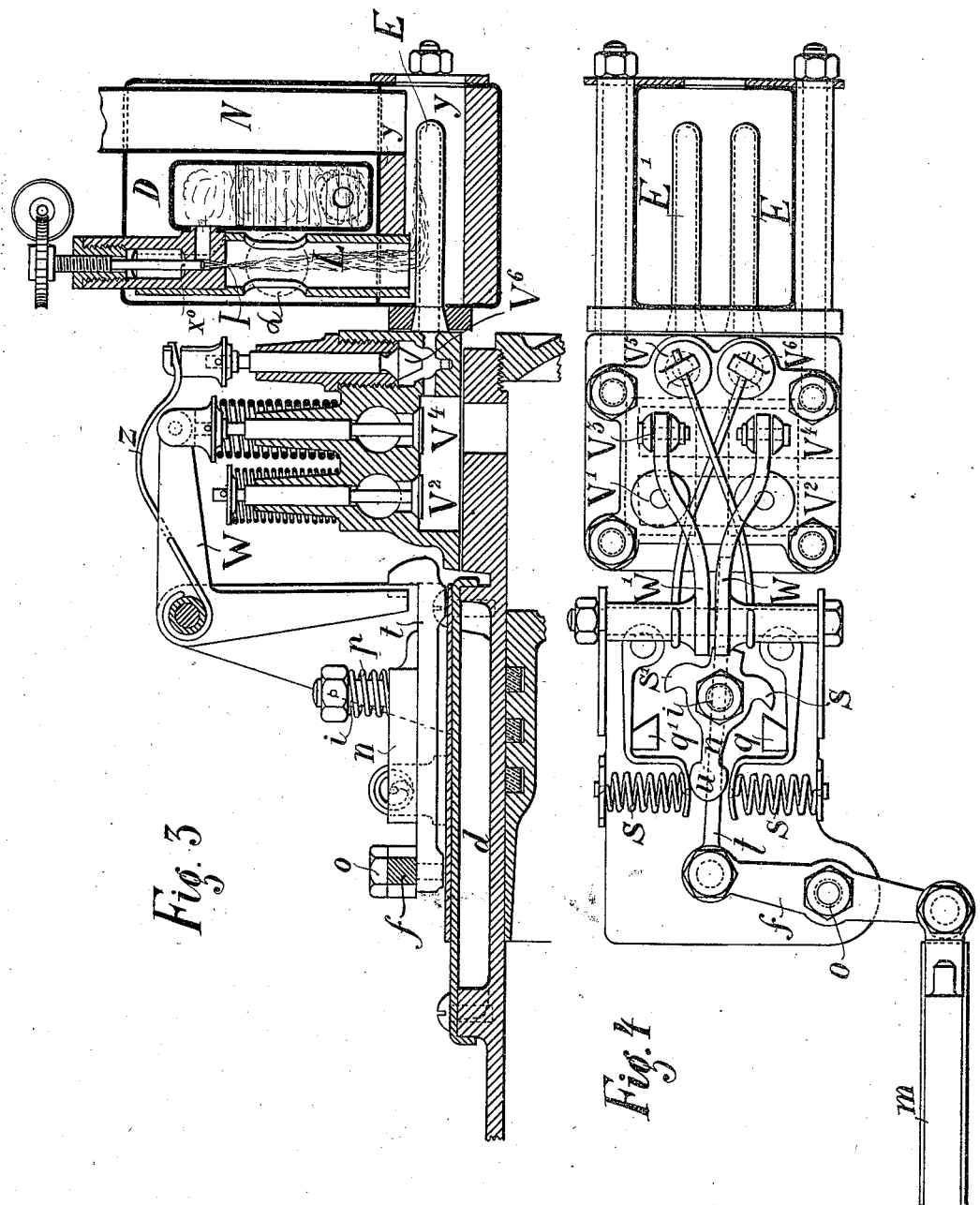

UNITED STATES PATENT OFFICE.

ALOIS WOLFMÜLLER, OF MUNICH, GERMANY.

VELOCIPEDE.

SPECIFICATION forming part of Letters Patent No. 547,511, dated October 8, 1895.

Application filed October 30, 1894. Serial No. 527,499. (No model.)

*To all whom it may concern:*

Be it known that I, ALOIS WOLFMÜLLER, a citizen of the Kingdom of Bavaria, and a resident of Munich, Bavaria, Germany, have invented certain new and useful Improvements in Velocipedes, of which the following is a specification.

The present invention relates to bicycles of that class which are driven by motors.

The object of the invention is to produce a bicycle of simple construction and economical to manufacture, one that will not easily get out of order nor be easily injured, one in which there is no danger from the motor, and to produce a simple form of motor cheaply operated and easily regulated.

Figure 1 shows a profile view, and Fig. 2 a sectional view, of my bicycle. Figs. 3 and 4 show details of the valve-gear, the valve-chest, and the lighting apparatus. Figs. $1^a$, $2^a$, 5, 6, and 7 illustrate details of construction.

The driving-motor is located in a fixed structure, which consists of two angular parallel and connected frames made of eight tubes $a'$ to $a^8$. The cylinder is located almost horizontally between the driving-wheel B and the steering-wheel A. The steering mechanism of the wheel A is the same as in all bicycles. The driving-wheel is spokeless (a disk-wheel) and carries cranks at both sides of its axle. The bearings of the axle are rigidly connected with the frame by the bolts $k$ and $k'$. The driving-rods $l$ and $l'$ extend from the cranks $g$ $g'$ to the pistons to which they are connected by means of ball-pivots. On top and under the cylinder there is a jacket $d$ $d'$, Figs. 1 and 2, connected with a water-reservoir C for cooling purposes. This water-reservoir C is located over and serves as a guard for the upper half of the rear wheel, which, by its rotation, works as a kind of ventilator upon the inside surface of the protecting-reservoir in such a manner that the replacing of the water is only seldom required. The water is conveyed from the reservoir C to the chambers $d$ $d'$ by the tube $x$ and returned to the reservoir from the chambers by the tube $y$, both of which are shown in dotted lines, Fig. 1.

The valve-gear operates as follows: The semicircular arm $e$ of the driving-wheel B presses upon the rod $m$ at each turn of the wheel through the roller $r$, and the said rod $m$ is coupled to one end of a pivoted lever $f$, Fig. 4. The lever $f$ swings on the pivot $o$ and thereby, when the rod $m$ moves backward, the shouldered lever $t$ will move in the opposite direction. This shouldered lever $t$ carries in the middle of its length a core-piece $n$, pivoted on the bolt $i$, which is pressed down hard upon the lever $t$ by the spring $p$. The object is to offer a certain resistance to the revolving of the core-piece. Thus, for instance, if the rod $m$ is driven forward and the lever $t$ backward, the part $s$ of the core-piece $n$ will move against the shoulder $q$ and will remain there stationary. Then the entire core-piece $n$ must turn around the bolt $i$, whereby the piece $u$ of the core-piece $n$ will make a motion against the spring S and will compress the same. When the lever $t$ goes forward, the part $s$ will not be in contact with $q$, and as the core-piece $n$ turns harder when the spring S offers its resistance the core-piece $n$ will remain in the same position relatively to the lever $t$; but the entire lever $t$ and its core-piece $n$ will be thrown to the other side by the spring S. If now the lever $t$ moves back for the second time, the same thing will be repeated, but on the other side at $s'$, $q'$, and S'. In its movements the lever $t$ catches alternately the angular levers W or W', which actuate the exit-valves $V^3$ $V^4$ and also the ignition-valves $V^5$ and $V^6$. In the backward motion of the pistons of a twin motor, one drives out the combustion gases and the other compresses the mixture, and the various functions of the exit-valve of one of the cylinders and of the ignition-valve could be combined in another cylinder. During the compression period the fuse-valve must be closed in order to prevent premature lighting. It opens at the dead-point of the interior piston mechanism, while the educt-valve of the other cylinder closes. The fuse-valves are two sided, and in order to secure a sure closing at the two valve-seats they are flexibly connected with the angle-levers W W' by steel wires Z Z'. The function of the educt-valves is in no way hindered by this arrangement.

V and $V^2$ are automatically-working mixture-sucking-in valves, as those used in other gas-motors.

As will be seen from Figs. 3 and 4, the priming is a glow-tube priming. The small glow-tubes E E' are heated by a benzine blow-lamp of the following construction: The required combustible material is conveyed to the wick-holder D of the lamp from the reservoir K, Fig. 1. The vapor generated in the former passes through the opening I into the Bunsen burner L. I provide a conical closing-needle $X^0$ in the small exit-opening, and this is never obstructed, as experiments have proved. Air is conveyed to the lamp through the caps M and through the frame-tube $a^7$, in order to avoid the construction of a separate air-conducting tube. This air flows into the lamps through a short connecting-tube 2, which branches off from the air-conducting tube and frame-tube $a^7$. (See Fig. 2.) As will be seen, the combustible gases pass from the Bunsen burner L into the glow-tube space lined with fire-bricks $y$, then into the chimney N, which extends up to the caps M through the tube $a^8$. Thus the air-inlet as well as the air-outlet pipes terminate in the caps M. In order to make the lamps burn well, a rather long chimney $a^8$ is provided. Besides, as the wheel is submitted to vertical oscillations during the ride, the air in the tubes must be forced to follow perfectly these movements in order that the burning of the lamps continue to be regular. This has been obtained by taking in the inlet-air at the same height as the mouth of the chimney. Two equal high air-columns are thus created, whereby an irregular motion of the combustible air during the riding is impossible. On account of the whirling movements during squalls the inlet and outlet openings cannot be constructed far apart, and therefore they are placed near each other by means of the cap M, the outlet-openings $j'$ being constructed around said cap next to the inlet-openings $j$. A valve $t^0$, actuated by a chain $e'$ and a regulating apparatus arranged upon the handle-bar, Figs. 5, 6, and 7 details, conveys the mixture through a pipe to the valve-chest. The regulating apparatus consists of a screw $s^0$, which is movable in a wall-hook $s^2$, fixed to the handle-lever. A movable pressing-lever $e^0$, provided with a half-female thread, is pressed by a spring against the screw $s^0$, and holds the latter in position. One extremity of the screw is connected with the valve $t^0$ by a chain, which exercises a constant pressure on the said valve. If the screw is loosened by pressing the lever $e^0$ down more or less quickly or by pulling it back more or less quickly, the valve for the mixture will operate accordingly through the chain and under the influence of the spring, and thereby the motor will act with more or less power and the gait will be increased or decreased. In order to be able to regulate the motion precisely, the screw $s^0$ is provided with a division-rod guided upon the wall-hook, and the latter is provided with a scale $e^2$, by the aid of which the screw, and consequently the valve $t^0$, can be precisely put in the desired position. This regulating apparatus can be worked by one finger without the rider being compelled to remove the hand from the handle-bar. Moreover by pressing upon an outlet-button, which is not shown in the drawings, the inlet of mixture and thus the working of the machine can be stopped at once.

The oil for lubricating the pistons is placed in the tubes $a^5$ and $a^6$, so that these tubes constitute not only part of the frame-tubes, but also an oil-reservoir.

A bell is provided for deadening the noise of the eduction.

In order that the motor shall work with more power upon the driving-wheel, a back-motion device in the shape of a spiral spring $x$ is provided with a connecting cord or band, and thus the cranks are given a driving motion as well during the forward as during the backward motion of the pistons. This cord (shown at 20, Fig. 1, in dotted lines) is connected with the piston-rod and tends to draw the same forward, thus giving the drive-wheel an impulse while the piston is returning to normal position.

The drawing power of the spiral spring $x$ can be regulated by the nut $Z^2$ and the small hand-wheel B'.

I claim as my invention—

1. A bicycle comprising the front and rear wheels, the main frame, formed of two pair of side frames each frame being made up of upper and lower bars, the motor carried between the four bars of said main frame and the connections from the motor to the rear wheels, substantially as described.

2. In combination with a bicycle a fluid motor carried thereby with driving connections to the driving wheel, the water jacket for said motor, the reservoir inclosing the upper portion of the driving wheel, and pipe connections from the reservoir to the jacket, substantially as described.

3. In combination with a bicycle having a two part tubular frame, a fluid motor carried by said frame having connections to the driving wheel, a water jacket for said motor, a reservoir encircling the upper portion of the driving wheel, said reservoir having its interior connected with the jacket through the tubular frame, substantially as described.

4. In combination with a bicycle a twin motor carried thereby, having driving connections with the driving wheel, and a single rod operated by the rear wheel and serving to operate the outlet and ignition valves, substantially as described.

5. In a motor bicycle, the combination with the twin motor of the single rod operated by the driving wheel the arm lever $t$ having forward and backward and also sidewise movement, the movable cross piece bearing upon the same, the springs S, the right and left levers W operated alternately by said parts, the lighting valves, and the flexible connection Z thereto, substantially as described.

6. In a motor bicycle, the combination with the motor of means for regulating the inlet of the gas mixture into the motor comprising a screw $s^0$ arranged upon the handle bar, the drawing chain connected thereto, the lever $e^0$ for keeping the same in place, having a nut actuated by pressure thereon, and the graduated device $e^2$ $s^3$ whereby the gas mixture valve can be put in the desired position, substantially as described.

7. In a motor bicycle the combination with the motor having connections to the driving wheel, of a back motion device consisting of an adjustable spiral spring $x$ secured to the driving rods for drawing upon them during the backward movement of the piston, substantially as described.

8. In a motor bicycle the combination of the motor, the igniting lamp, the air conduit leading thereto, the smoke conduit leading therefrom and the inlet and outlet chamber M having a compartment for the inlet and an outlet said compartments being connected with the inlet and outlet pipes substantially as described.

9. In a motor bicycle, the combination of the motor, the igniting lamp, the air conduit leading thereto and the smoke conduit leading therefrom, both of said conduits being formed through the frame of the machine substantially as described.

In testimony that I claim the foregoing as my invention I have signed my name in presence of two subscribing witnesses.

ALOIS WOLFMÜLLER.

Witnesses:
HEINRICH HILDEBRAND,
ANDREW JONFRAY.